US010160229B2

(12) United States Patent
Kučera et al.

(10) Patent No.: US 10,160,229 B2
(45) Date of Patent: Dec. 25, 2018

(54) METHOD OF LASER BEAM WRITING WITH SHIFTED LASER SURFACE TEXTURING

(71) Applicant: University of West Bohemia, Pilsen (CZ)

(72) Inventors: Martin Kučera, Blovice (CZ); Denys Moskal, Plzen (CZ); Jiří Martan, Stenovice (CZ)

(*) Notice: Subject to any disclaimer, the term of this patent is extended or adjusted under 35 U.S.C. 154(b) by 0 days.

(21) Appl. No.: 15/576,833

(22) PCT Filed: May 28, 2015

(86) PCT No.: PCT/IB2015/000807
§ 371 (c)(1),
(2) Date: Nov. 26, 2017

(87) PCT Pub. No.: WO2016/189344
PCT Pub. Date: Dec. 1, 2016

(65) Prior Publication Data
US 2018/0162142 A1   Jun. 14, 2018

(51) Int. Cl.
| | | |
|---|---|---|
| *B23K 26/082* | (2014.01) | |
| *B41J 2/47* | (2006.01) | |
| *B23K 26/352* | (2014.01) | |
| *B23K 26/00* | (2014.01) | |
| *B23K 26/359* | (2014.01) | |

(Continued)

(52) U.S. Cl.
CPC ............ *B41J 2/471* (2013.01); *B23K 26/0006* (2013.01); *B23K 26/0622* (2015.10); *B23K 26/082* (2015.10); *B23K 26/0821* (2015.10); *B23K 26/355* (2018.08); *B23K 26/359* (2015.10); *B41J 2/455* (2013.01); *B41M 5/24* (2013.01)

(58) Field of Classification Search
CPC ......... B41J 2/471; B41J 2/455; B23K 26/355; B23K 26/0622; B23K 26/0006; B23K 26/0821; B23K 26/359; B23K 26/082; B41M 5/24
See application file for complete search history.

(56) References Cited

U.S. PATENT DOCUMENTS 5,329,090 A * 7/1994 Woelki .................. B23K 26/08
219/121.68

FOREIGN PATENT DOCUMENTS

| JP | 2002-144055 A | * | 5/2002 | ............ B23K 26/00 |
| WO | WO 2013156664 A1 | * | 10/2013 | ............ B23K 26/08 |

* cited by examiner

*Primary Examiner* — Yaovi M Ameh

(57) ABSTRACT

The shifted laser surface texturing method is a method of writing of large arrays of small objects (5) on surface or inside of a material. The whole array of objects (5) is produced by repeated linear raster (1) laser processing with sequential shifting of linear raster between each repetition of the scanning process. The linear raster is a set of paths (1) for laser beam scanning. Distance between spots (2) in the laser beam path (1) of the linear raster is defined by speed of laser beam scanning and by period between laser pulses. Sequence of linear raster shifts (4) defines the form of the small objects (5) in the array. Computational data for an array of the same objects (5) is very low. It is comparable to the number of lines N in one linear raster plus number of spots in one object. The presented method eliminates heat accumulation effect and strongly decreases plasma shielding effect, while at the same time enables effective use of high average power pulsed lasers.

16 Claims, 19 Drawing Sheets

(51) Int. Cl.
  *B23K 26/0622* (2014.01)
  *B41J 2/455* (2006.01)
  *B41M 5/24* (2006.01)

METHOD OF LASER BEAM WRITING WITH SHIFTED LASER SURFACE TEXTURING

TECHNICAL FIELD

The invention relates to laser systems and processes of laser processing of materials and can be used for laser processing with galvanometer-scanner or ultra-high-speed scanners or their combinations.

BACKGROUND ART

Laser surface texturing (in abbreviated form—LST) is a technology used for example for fluid-film bearing enhancement, thermal spray substrate preparation, light absorption increase on surface, biomedical implants preparation, replicas formation, microfabrication and patterning of glass and ceramic materials, reduction of dynamic friction, formation of hydrophobic or hydrophilic surfaces, anticorrosion processing, manufacturing of magnetic disks, microelectronics components, and so on. Application of LST processing with high repetition rate of laser pulses involves heat accumulation effect, which is undesirable in most cases. Another problem appears when LST involves overlapping of laser spots and plasma shielding effect. For overcoming of these problems, there exist several basic proposals: time-frequency modulation of laser scanning process [Frank Edward Livingston, Henry Helvajian. Pulse modulation laser writing system. U.S. Pat. No. 7,526,357 B2. (public. year (2009)], LST processes with random laser beam irradiation paths [Hwang Hae Lyung et al. Structure of micro laser beam irradiation for fractional micro ablation and method of irradiation. Application number WO 2007111396 A1. (public. year 2009)] or high speed laser beam scanning systems [B. Jaeggia et al. High precision surface structuring with ultra-short laser pulses and synchronized mechanical axes. Physics Procedia 41 (2013) 319-326]. These methods of LST give possibility for formation of large arrays of microobjects in material, but do not solve question about overcoming heat accumulation effect and simple logic for formation of large arrays of objects (with thousands or millions of objects). Moreover, formation of large array of objects become extremely volumetric challenge for software processing when it is needed to form an array of micro objects with specific 3D structure (array of hollow cylinders, donuts or microcubes and etc.).

There are several additional techniques for creation of array of objects with specific energy distribution: using arrays of microlenses, multibeam interference, presetting of geometrical parameters for every object in the array, multi scan head laser system job. Mentioned techniques involve complex optical schemes or are bounded with processing of wide range of data by parallel threads.

Ultra-high speed laser beam polygon scanners give possibility to use high repetition rate lasers with smaller overlapping [You-Hie Han. Structure of micro laser beam irradiation for fractional micro ablation and method of irradiation. Patent number EP1586406 A1. (public. year 2005)]. Newest hybrid polygon scanning systems give possibility to high-speed formation of large array of objects [Ronny De Loor et al. Polygon Laser Scanning. A need for speed in laser processing and micromachining. Laser Technik Journal 3 (2014)]. But for these systems stay unresolved the problem of processing of arrays of microobjects with specific geometry [Glenn E. Stutz. Polygonal Scanners: Components, Performance, and Design. Handbook of Optical and Laser Scanning, Second Edition. (2011)]. It is difficult to control laser drilling of microobjects with high speed processing, because there is a lot of data about large arrays with small objects or microobjects. Additionally there is not enough time for precise control of laser spot distribution inside every microobject in the array. Moreover, the ultra-high speed laser beam processing with polygon scanning involves artefacts like jitter, banding, bow and other problems characteristic for these systems. These artefacts involve two components—periodical and random. There are several hardware techniques for reduction of polygon scanner artefacts, but known classical methods of laser beam processing of the array of objects in ultra-fast scanning systems do not have a fully finished solution of the mentioned problems and need to be improved.

More detail description of existing LST techniques can be find here:

[L Li et al. Large-area laser nano-texturing with user-defined patterns. J. Micromech. Microeng. 19 (2009)]

[Guy M. Burrow and Thomas K. Gaylord. Multi-Beam Interference Advances and Applications. Micromachines. 2, 221-257 (2011)]

[Polygon Scanner Turns USP Lasers into Sprinters—High-Productivity Hybrid Scanner Technology from SCANLAB. PRESS RELEASE. SPIE Photonics West. (2015)]

[Sasaki Yoshio et al. Information recording apparatus and information recording method. Application Number: 12100463. (public. year 2009)]

[B. Jaeggia et al. High throughput ps-laser micro machining with a synchronized polygon line scanner. 8th International Conference on Photonic Technologies LANE 2014. (2014)]

DISCLOSURE OF INVENTION

Problems

The present invention is conceived to solve the aforementioned problems.

The first problem is to overcome the heat accumulation effect for high repetition rate of laser pulses.

The second problem is to overcome the plasma shielding effect without interruption or slowing down of laser beam scanning process.

The third problem is formation of large arrays of micro- or macro objects with specific laser pulse distribution inside of them with low volume of processing data.

The fourth problem is writing of large array of microobjects by ultra-high speed laser beam scanning without computation delay and laser beam speed decreasing for microobjects array processing.

The fifth problem is reduction of polygon scanner artefacts (jitter, banding, bow and other) for laser beam processing with the large array of objects.

Solution

The present invention is a new method of laser processing of material, which is named shifted laser surface texturing (in the shorter form—shifted LST). The invented shifted LST is a method of writing of array of small objects (cylinders, cones, donuts or microcubes and etc.) on surface or inside of a material. By writing is meant any process induced by laser, which produce a material change, for example marking, engraving, recrystallization, melting, forming, and film removal. The whole array of objects is produced by repeated linear raster laser processing with sequential shifting of the linear raster between each repetition of the scanning process. Each object in the array is formed by a sequence of laser spots—maximum one spot during each raster repetition.

The linear raster is a set of paths for laser beam scanning (FIG. 1). Usually these paths are straight lines (FIG. 1, labelling 1—a path of the linear raster), but they can be also curved lines, broken lines or other lines. The paths for laser beam scanning contain a sequence of distant laser spots (FIG. 1, labelling 2—a spot in the one path). One laser spot contains one laser shot (one shot mode, like on FIG. 1) or several shots per one spot (burst mode, like on FIG. 2, labelling 2—a spot contains several shots; one spot is marked by dotted outline). For one object, one spot is applied once per one scan. Distance between spots in the line of the raster is defined by speed of laser beam scanning and by period between laser pulses (usually defined by pulse repetition frequency). The positions of the first and the last one spot in the one line are defined by switching on and switching off timing of the laser beam scanning process.

When the first linear raster laser scan is finished, the next linear raster laser scan starts from position which is shifted on the processing surface (FIG. 3, labelling 3—two lines from two sequenced linear rasters, labelling 4—shift of the linear raster, movement by one vector). It means, that after the next linear raster laser scan the laser spots are applied on the positions, which are shifted from the previous positions by the value equal to the whole linear raster shift.

Sequence of linear raster shifts defines the form of the small objects in the array (FIG. 4, labelling 5—triangular object prepared by the shifted LST as an example). In this way, every object in the whole array is composed of laser spots, which are distant on surface during the scanning process and the shots for formation of neighbour spots are divided in time. This is one solution for two first mentioned problems. Heat accumulation effect disappear, because overlapped spots are applied with time interval equal for one linear raster scanning process at minimal. Plasma shielding effect is decreased, because shots for formation of sequenced spots are applied on distant positions on surface.

In the present invention the overlapping of spots inside of the objects is defined by a shifting vector value of the linear raster. There isn't direct determination of every object in the whole array, but the form of objects, distance between spots in the objects and delays between spots writing for whole objects are defined by the sequence of shifts between linear raster scanning processes. This is a solution for the third mentioned problem, because there is no need to spend additional computational resources and total value of computational data for an array of the same objects is comparable to the number of lines N in one linear raster plus number of spots in one object M (FIG. 4, labelling N—is number of lines in one raster, M—is number of shots in one object (for demonstrated triangular object on FIG. 4 the M is equal to three).

In the present invention the shifted LST method produces array of objects by shifting of the linear raster, which corresponds to formation of objects inside of the array. As a result, it is not needed to spend any time for control of processing of every object in the array separately. This is a solution of the fourth problem—for laser beam processing in ultra-fast scanning systems.

The present invention includes shifted LST method for formation of arrays of objects with specific distribution of the objects and objects with complex structure. Specific distribution of the objects is achieved by shifted LST with linear raster with corresponding form of lines (like spirals, harmonic waves, square paths or triangular paths and other forms). The complex structure of the objects (like hollow cylinder with shorter cylinder inside, cone in a cube, circle inside of hexagon and other structures) is achieved by serial application of several linear rasters.

Each object in the array is produced by the same laser spot in the same line of the linear raster. It is a solution of the fifth mentioned problem, because in the present invention the periodical component of artefacts is automatically reduced by the shifted LST, where one object is formed by the one laser spot in the one line using the same polygon mirror. This technique is denoted as: one object—one spot from the same mirror shifted LST technique. The random components of artefacts are reduced too, because in shifted LST every object in array is formed by the same laser spot, individual for every object. By this the maximal value of random artefacts component for one object is not maximal value from all objects, but individual for every object in the array. Moreover, additional correction of lines form in the linear rasters by involving of corresponding curvature provides control of objects precise positions in the array. Optionally it can include correction of lines form inside of all rasters for all lines from scan to scan through whole the shifting sequence.

The depth of objects, drilled by the shifted LST, is generally controlled by repetition of the whole sequence of shifts with linear rasters scans. For array of objects with simple depth structure, the sequence of shifts of linear rasters in different repetitions is the same. For array of objects with complex structure or combination of objects inside of the array, the sequence of shifts and rasters are different—in dependence on the target structure and depth profile of objects.

The invented shifted LST method is applicable also for creation of macroobjects, which are constructed from microobjects inside of the array. It means that every microobject in the array is used as one pixel for formation of a macroobject. In this case, pixelization is decreased, but reduction of artefacts of polygon scanning systems (like jitter, banding, bow and other systematic problems) stays to be settled. Moreover, as for all previous solutions in this case the heat accumulation effect is overcome and plasma shielding effect is decreased too.

The invented shifted LST method produce arrays with different objects, when linear rasters containing lines with different distances between the laser spots are used (FIG. 5). The different distance between laser spots is according to difference of the objects in the array (FIG. 6). In shifted LST different distance between laser spots is achieved by two ways. The first one is laser beam acceleration or deceleration inside of every line in the linear raster. The second one is laser pulse switching time control inside of every line in the linear raster. The first one does not involve laser pulse switching and is more attractive for laser processing with stable frequency of laser pulses generation. This way involves specific algorithm for calculation of laser beam speed correction in direction of lines of linear rasters. For galvanometric and hybrid polygon scanning system with two mirrors galvanometer scan head this goal is approached by movement of scan head mirrors, which causes deceleration and acceleration of laser beam movement on surface (FIG. 7). The second one way of defining different distances between laser spots has no specific algorithm for deceleration and acceleration calculations, but need to involve calculations of delay between pulses and hardware solution for controlling of pulse sequence in every line in the linear rasters. The shifted LST method optionally includes the combination of speed control of laser beam scanning with laser shots delay control for more flexible processing of arrays with different structure.

The invented shifted LST method provides reduction of artefacts of polygon scanning systems, like jitter, banding, bow and other systematic problems by synchronisation between rotation of polygon and scanning lines in linear raster. It means that every line of raster is produced by reflection of laser beam from different mirror of polygon, but for the same line in the sequence of linear rasters the mirror on the polygon is the same. The same mirror on the polygon is reflecting laser beams for several lines in one linear raster, if number of lines in one raster is more than number of mirrors in the polygon. For example at shifted LST by a raster with ten lines and polygon with five mirrors the same mirror will be in use twice for two different lines in one raster. In the case that the number of lines in a raster and number of mirrors on a polygon are indivisible, then it is needed to calculate a correct delay between shifts of linear rasters. This solution gives additional time for reset of mirrors of galvanometer scan head to the start position. The second solution for reduction of polygon scanning artefacts is recalculation of every laser path in every linear raster with taking into account of different artefacts from different mirrors, but this way is helpful only for periodic component of artefacts. Additional solution is formation of linear rasters with number of lines divisible by the numbers of mirrors on the polygon.

Advantageous Effects

The present invention of shifted LST has the following advantages.

According to the present invention, the heat accumulation effect in high repetition rate laser processing is eliminated, because objects for laser beam writing are composed of laser spots, which are distant on surface and in time in the scanning process.

The plasma shielding effect is overcome, because the shots for formation of neighbour or overlapped spots in one object are divided in time equal to time of one or more scans.

Distance of laser spots on surface and division of laser shots in time is produced without interruption or slowing down of laser beam scanning process.

Formation of large arrays of micro- or macro objects with specific laser pulse distribution inside them is produced with appreciable decreased volume of processing data, because there isn't direct determination of every object in the whole array.

Large array of microobjects is produced by ultra-high speed laser beam scanning without computation delay and laser beam speed decreasing.

Reduction of polygon scanner artefacts (like jitter, banding, bow and other systematic problems) for laser beam processing of the large array of objects is achieved by one object—one spot from same mirror shifted LST technique.

For shifted LST it is not necessary to synchronize every laser pulse with the scanner, which usually needs expensive hardware and limits the maximum pulse repetition rate.

Shifted LST enables effective use of pulsed lasers with high average power (lower pulse energy, high repetition rate), which is up to now not possible without significant thermal effects on the material.

BRIEF DESCRIPTION OF THE DRAWINGS

Full List of Reference Signs on Figures

1—a path of laser beam scanning in the linear raster;
1—a laser spot that contains one laser shot (one shot mode) or several shots per one spot (burst mode);
3—lines in the consequential linear rasters;
4—shift of the linear raster;
5—an object formed by shifted LST (as an example it has a triangular form);
6—linear raster border;
7—laser beam;
8—galvanometer scan head;
9—mirrors of galvanometer scan head;
10—polygon with mirrors;
11—surface for laser beam processing.

FULL LIST OF FIGURES

Figure 1:
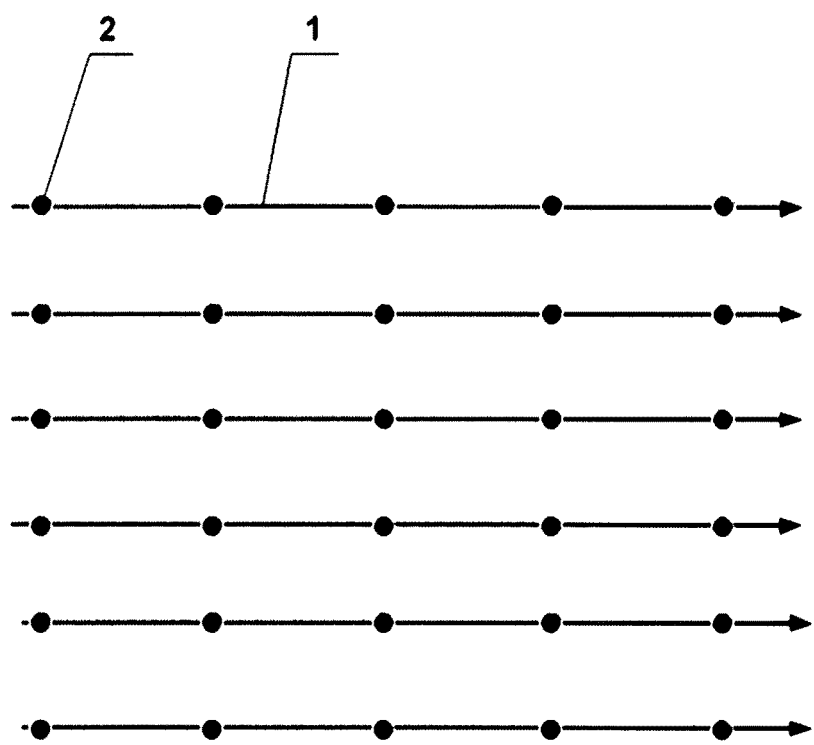

FIG. 1. Linear raster with one shot per one laser spot (one shot mode).

Figure 2:
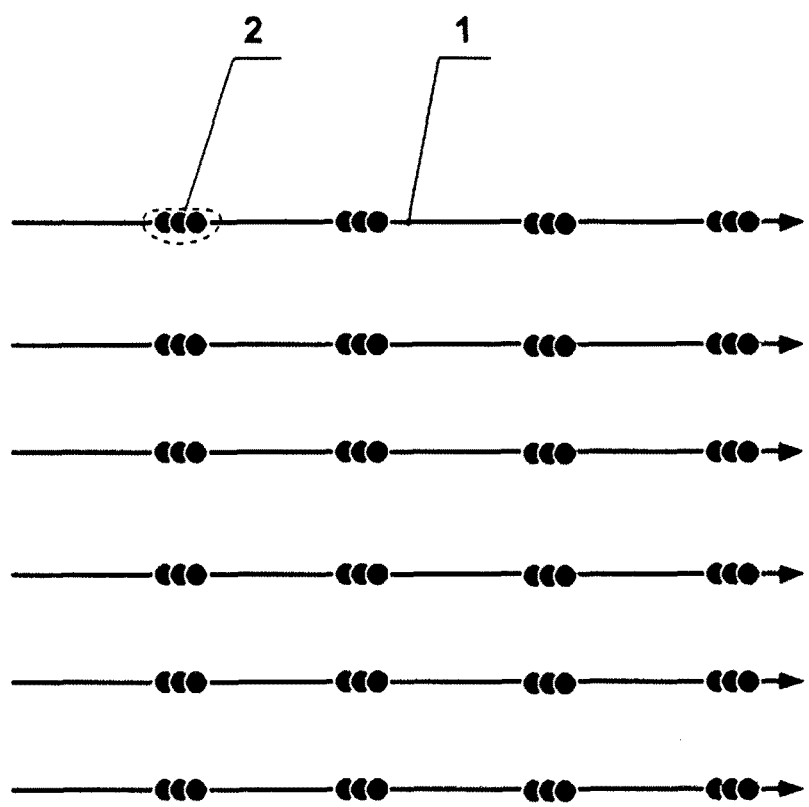

FIG. 2. Linear raster with several shots per one spot (burst mode). One burst spot is marked by dotted outline.

Figure 3:
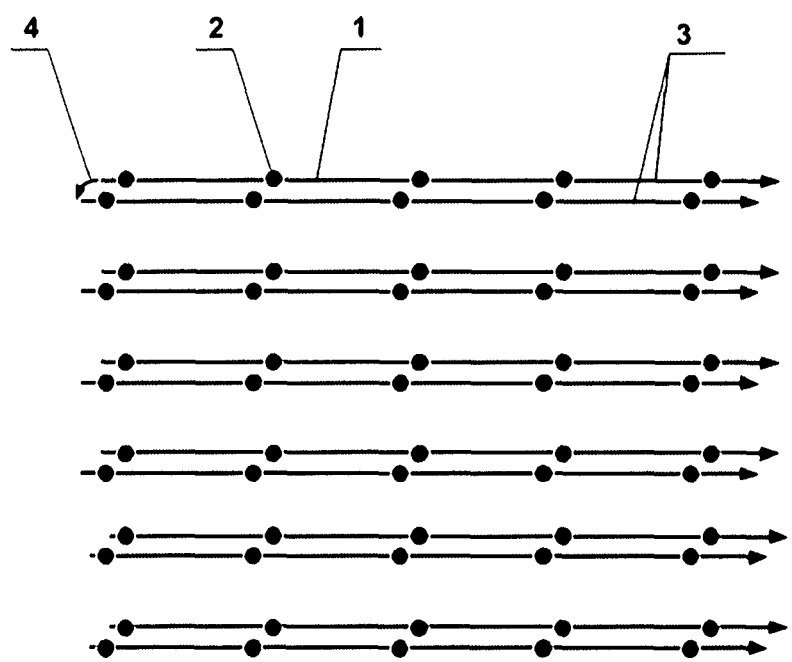

FIG. 3. One simple shift of the linear raster to the next position and formation of the neighbour linear raster at this position.

Figure 4:
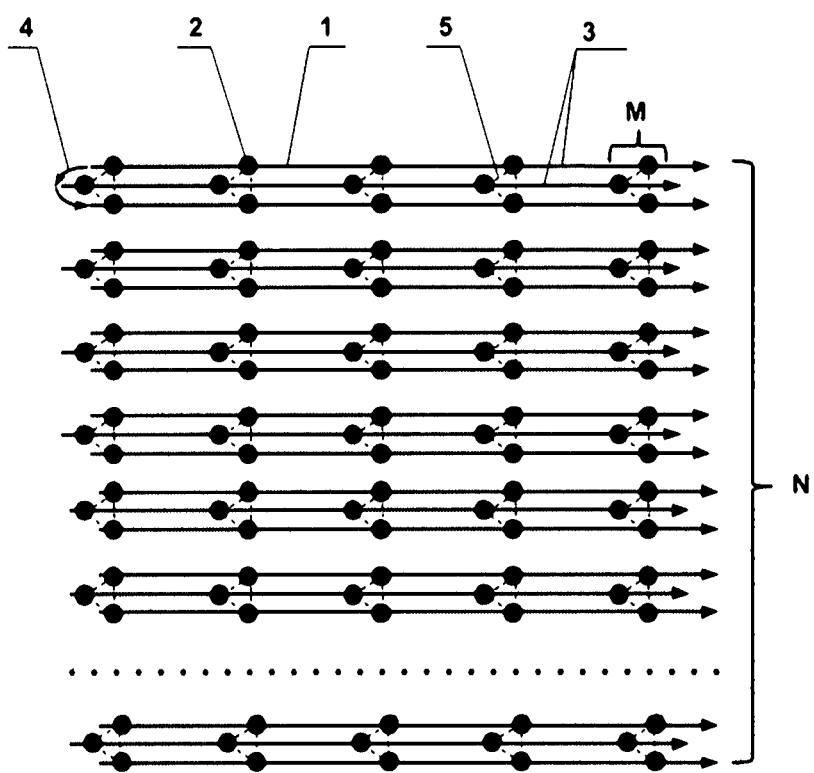

FIG. 4. Formation of triangular objects in an array by two sequenced shifts of the linear raster. M—is number of spots in one object, N—is number of lines in one linear raster.

Figure 5:
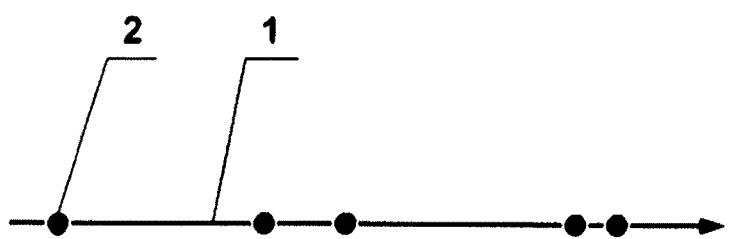

FIG. 5. One line of linear raster with different distances between laser spots.

Figure 6:
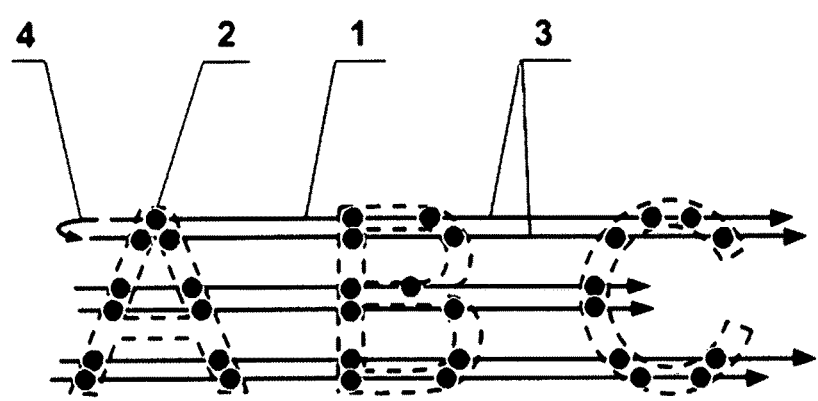

FIG. 6. Formation of objects with different form (on the figure the letters "ABC") by shifting of linear rasters with different distances between laser spots.

Figure 7:
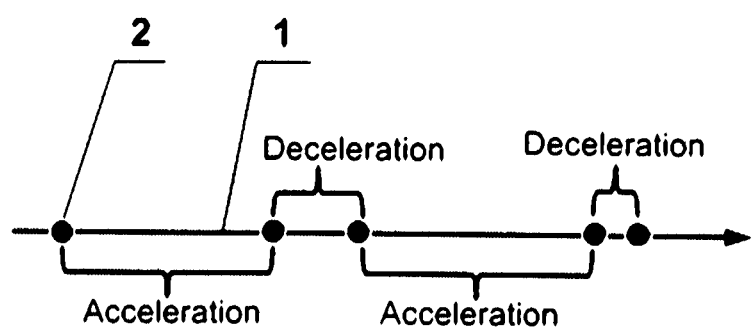

FIG. 7. Linear raster with different distances between laser spots achieved by deceleration and acceleration of laser beam.

Figure 8:
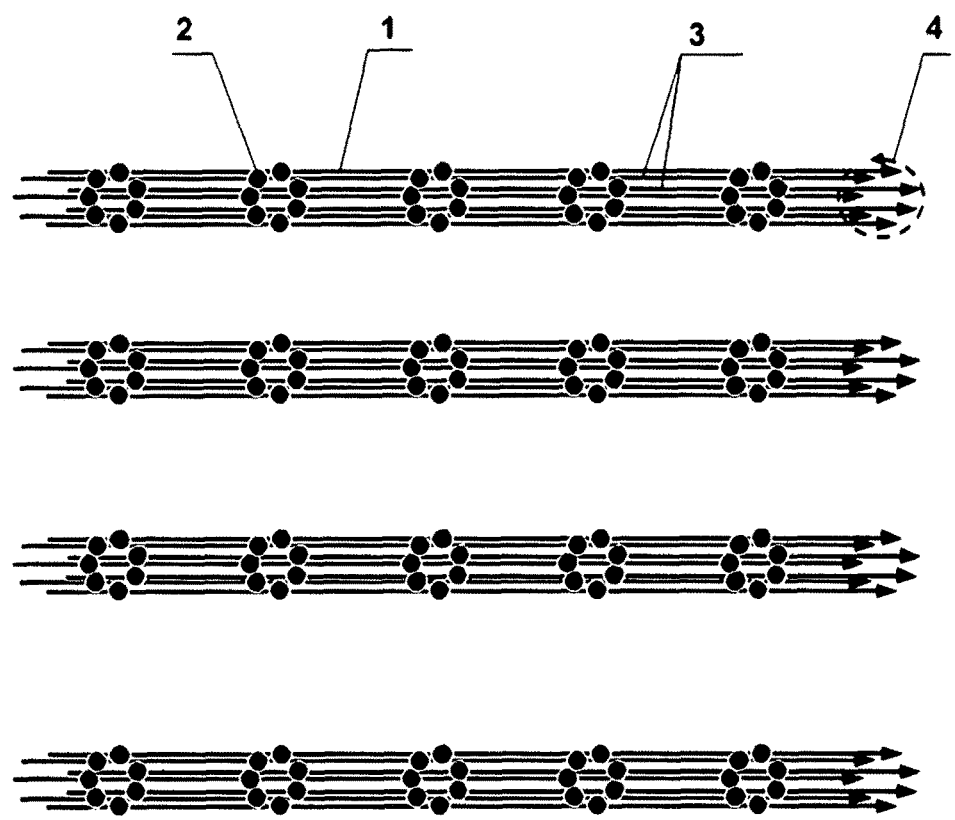

FIG. 8. Array of circular objects formed by a sequence of shifts of linear raster on a circular path.

Figure 9:
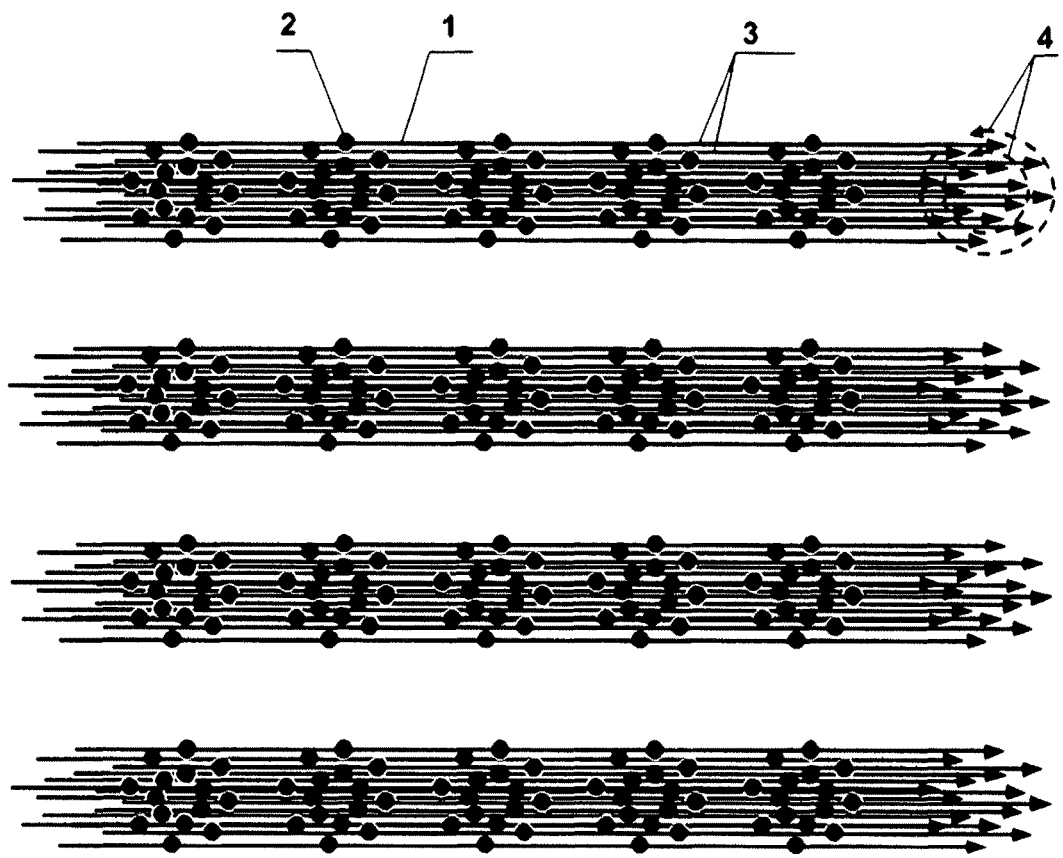

FIG. 9. Array of double circular objects formed by a sequence of shifts of linear raster on internal and external circular paths.

Figure 10:
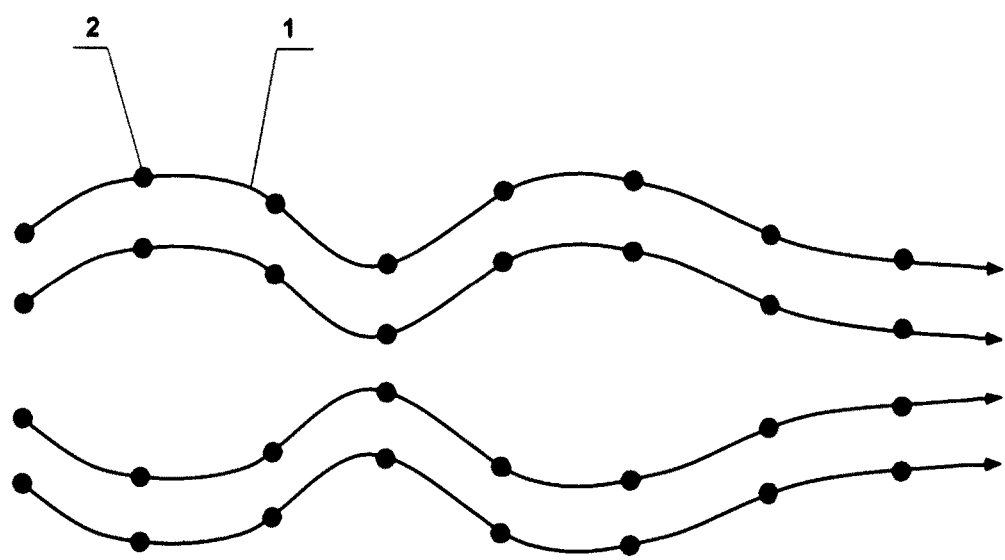

FIG. 10. Linear raster with curved paths of laser beam.

Figure 11:
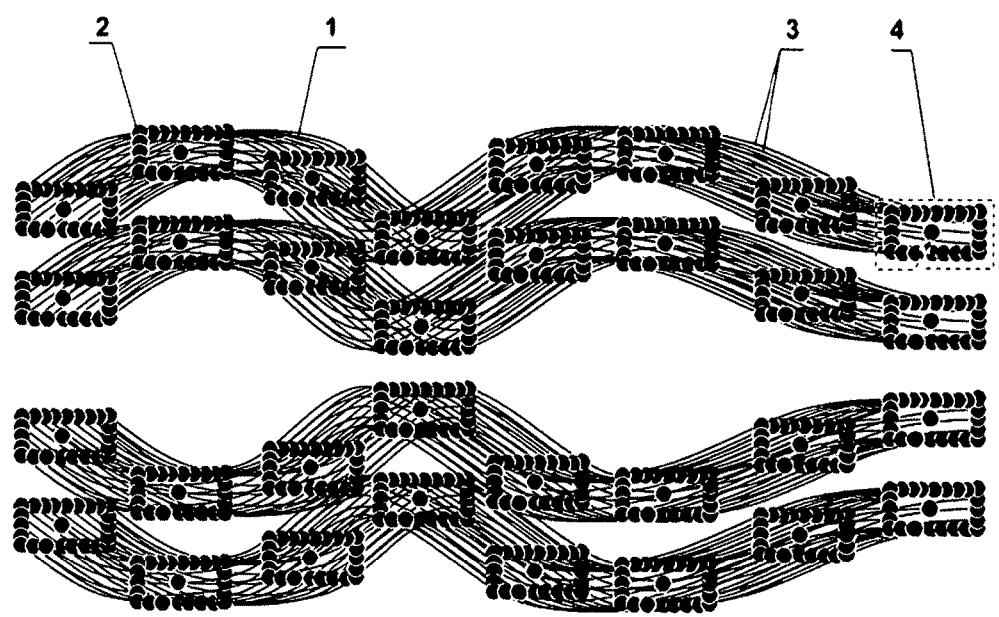

FIG. 11. Rectangular objects formed by shifting movement of linear raster by rectangular path and one extra linear raster application for central holes drilling.

Figure 12:
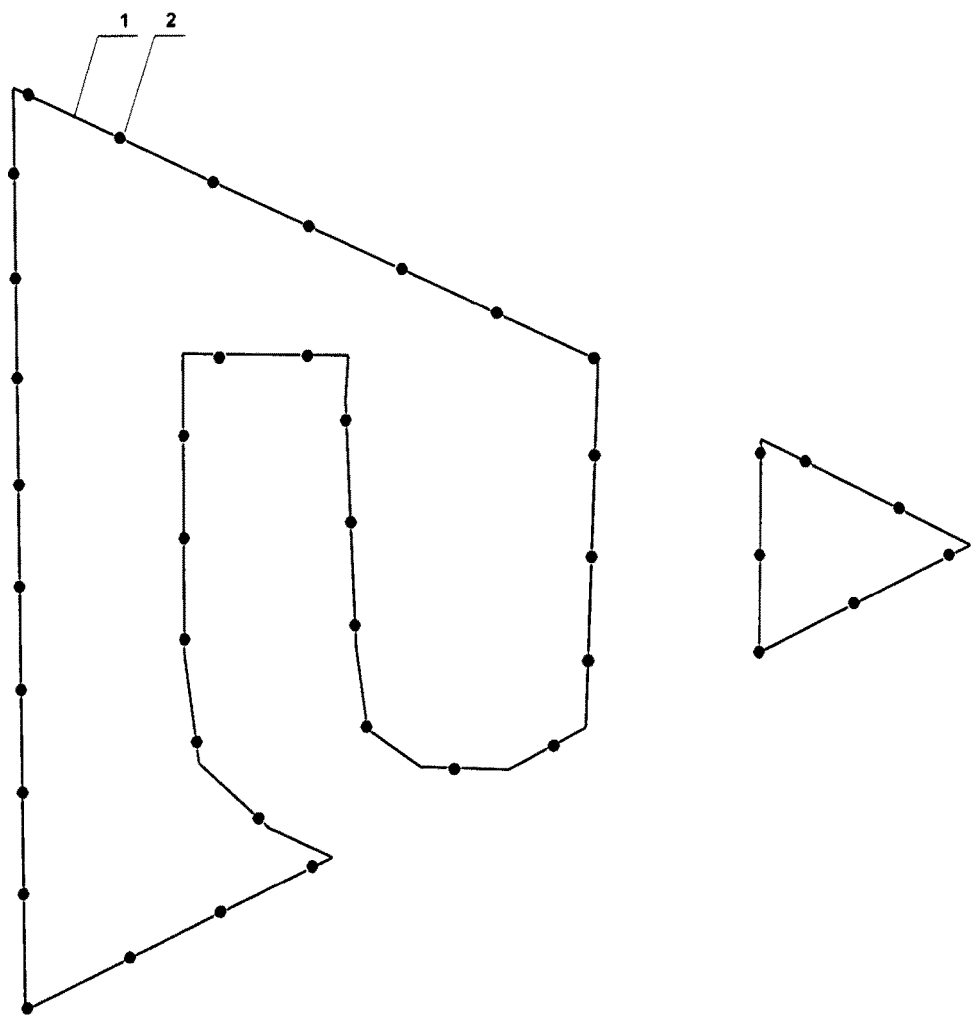

FIG. 12. An example of linear raster prepared for logo outline formation by shifted LST.

Figure 13:
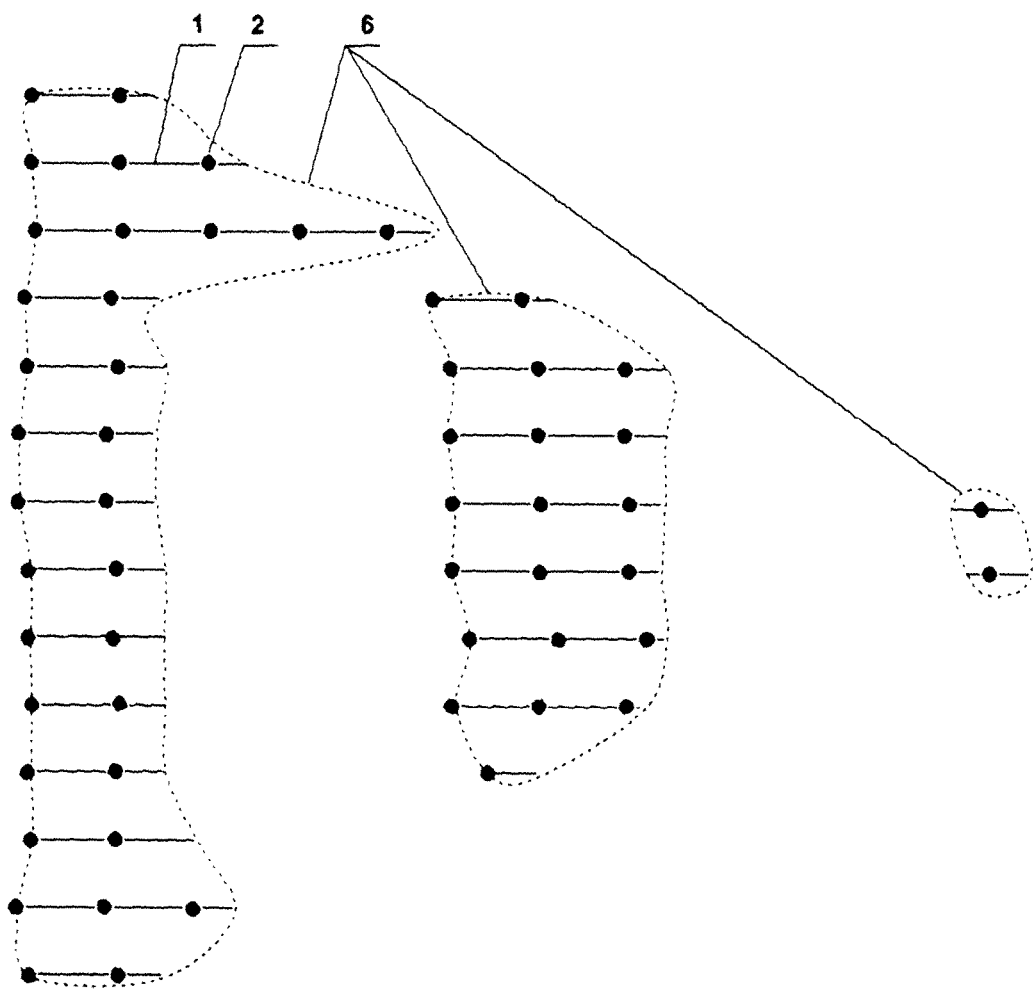

FIG. 13. Linear raster for hatching by microobjects with hatching area border (dotted line).

Figure 14:
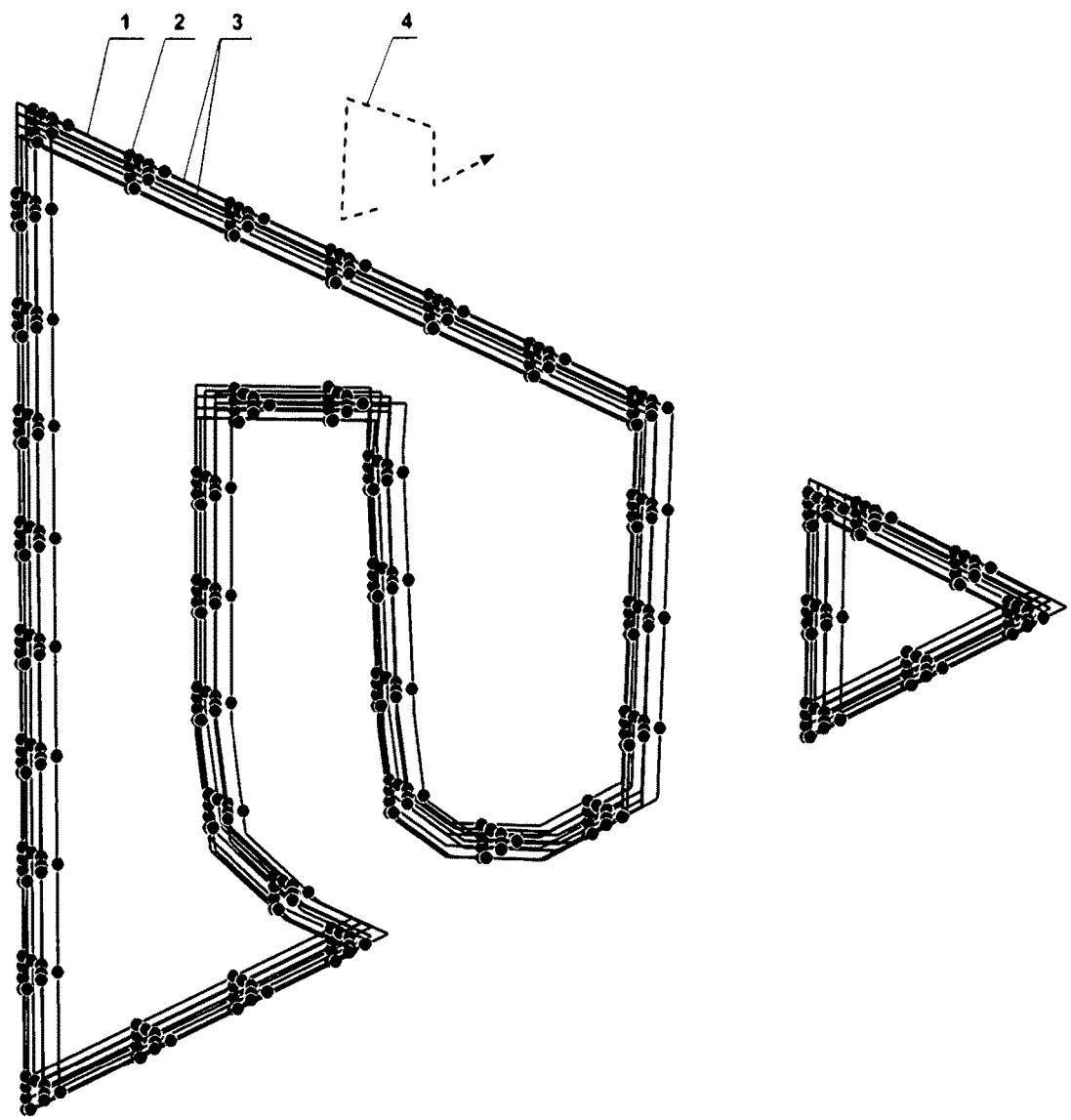

FIG. 14. Formation of logo outline from microobjects, prepared by shifted linear rasters. Dotted line is an enlarged sequence of shifting path.

Figure 15:
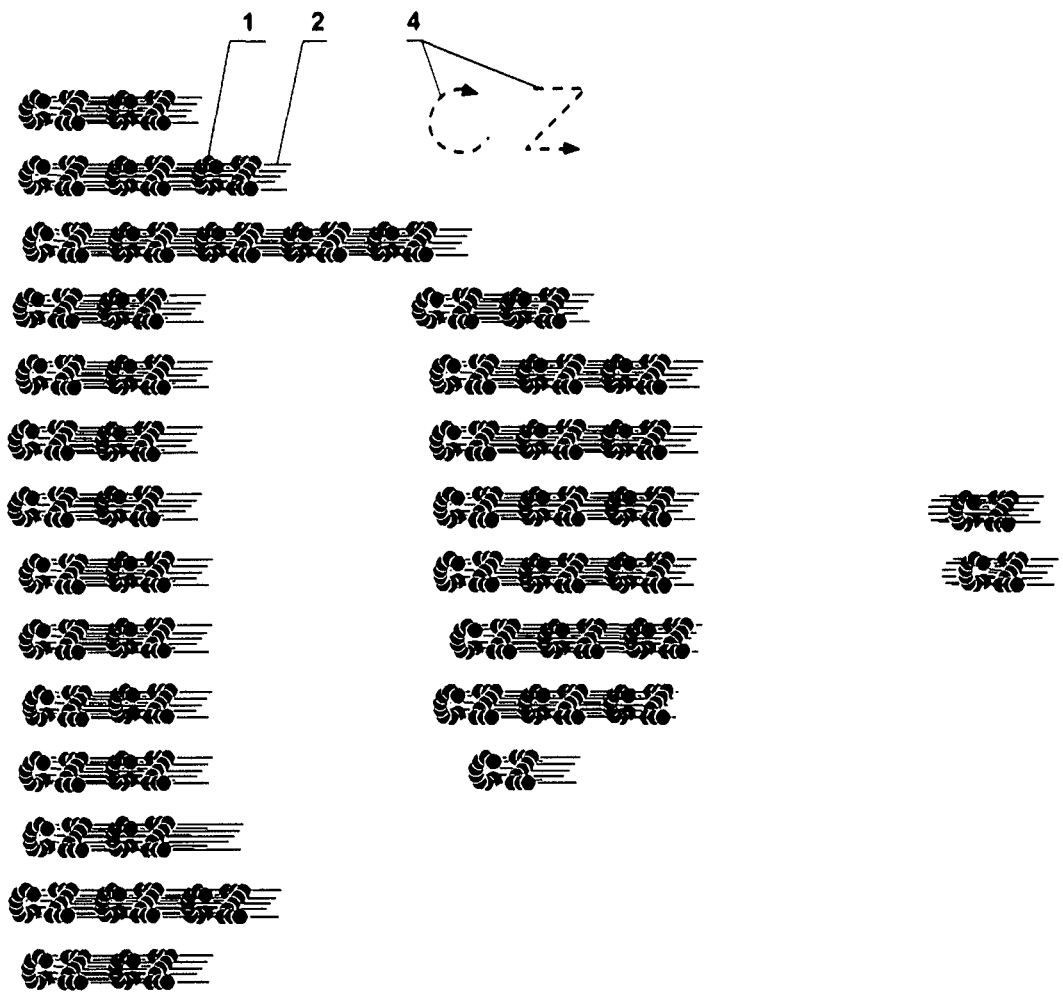

FIG. 15. Sequential shifting of linear raster along letters "C" and "Z" for formation of full hatching array with microobjects "CZ"

Figure 16:
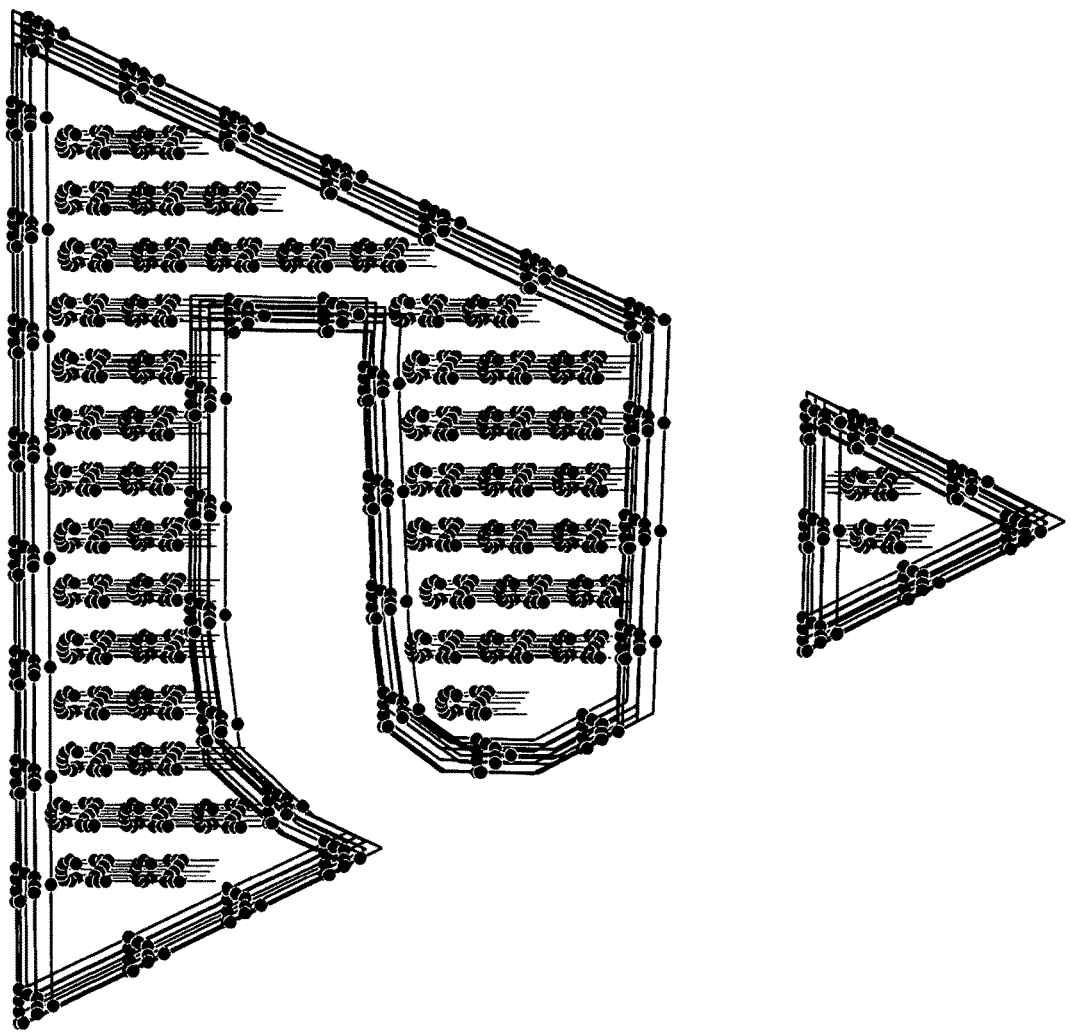

FIG. 16. Combination of two sequences of shifted linear rasters in one complex structure.

Figure 17:
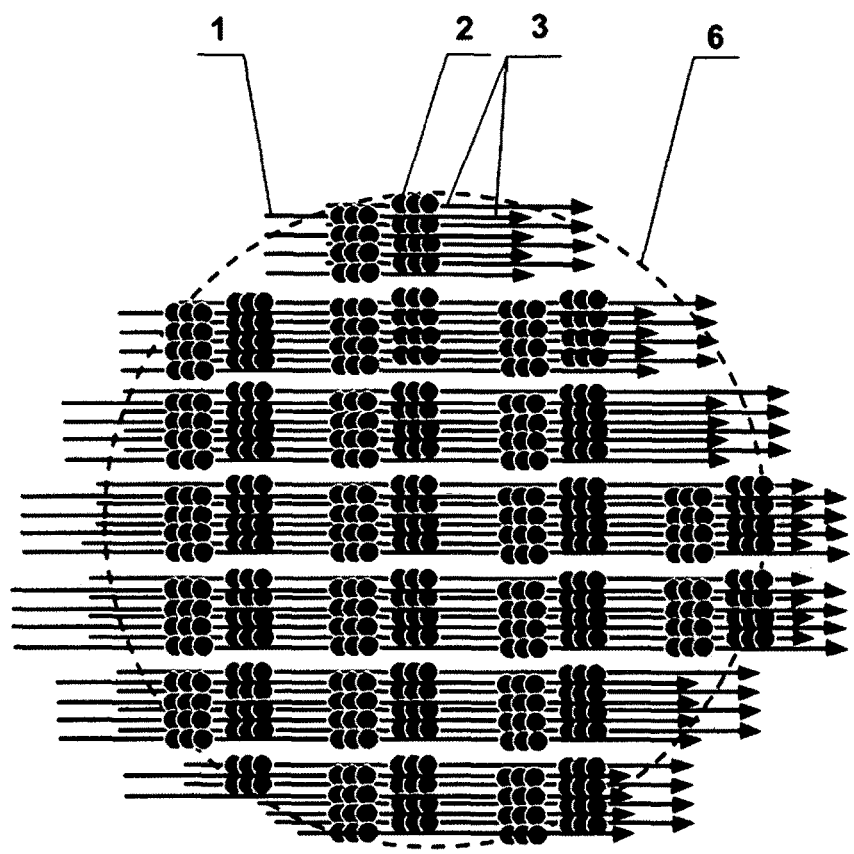

FIG. 17. Formation of circular macroobject from array of microobjects in burst mode. Dotted line is a macroobject border. On the drawing are shown only two first scans.

Figure 18:
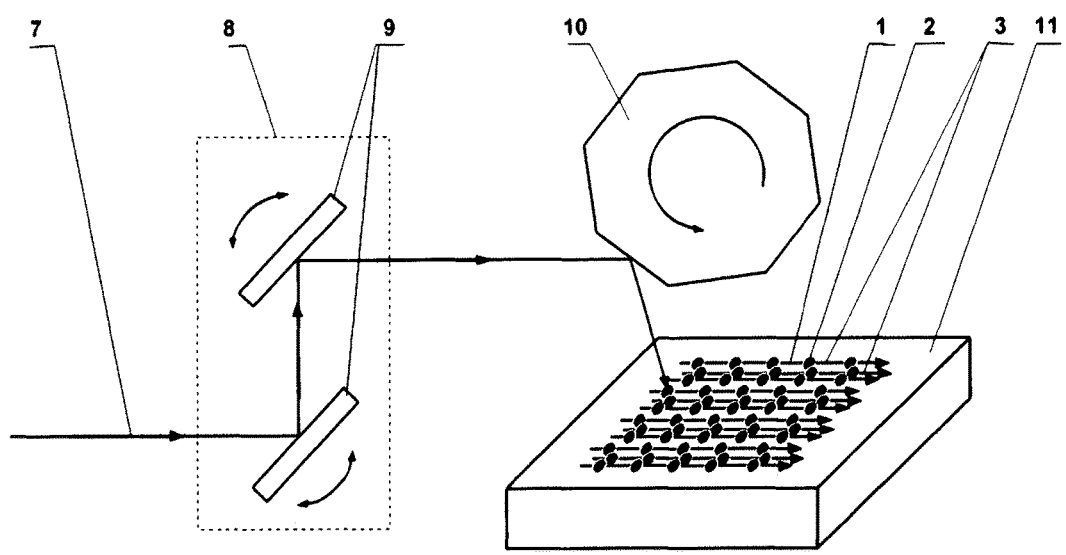

FIG. 18. Scheme of technical application of shifted LST method on hybrid polygon scanner with galvanometer scan head. Dotted line is a galvanometer scan head with two mirrors.

Figure 19:
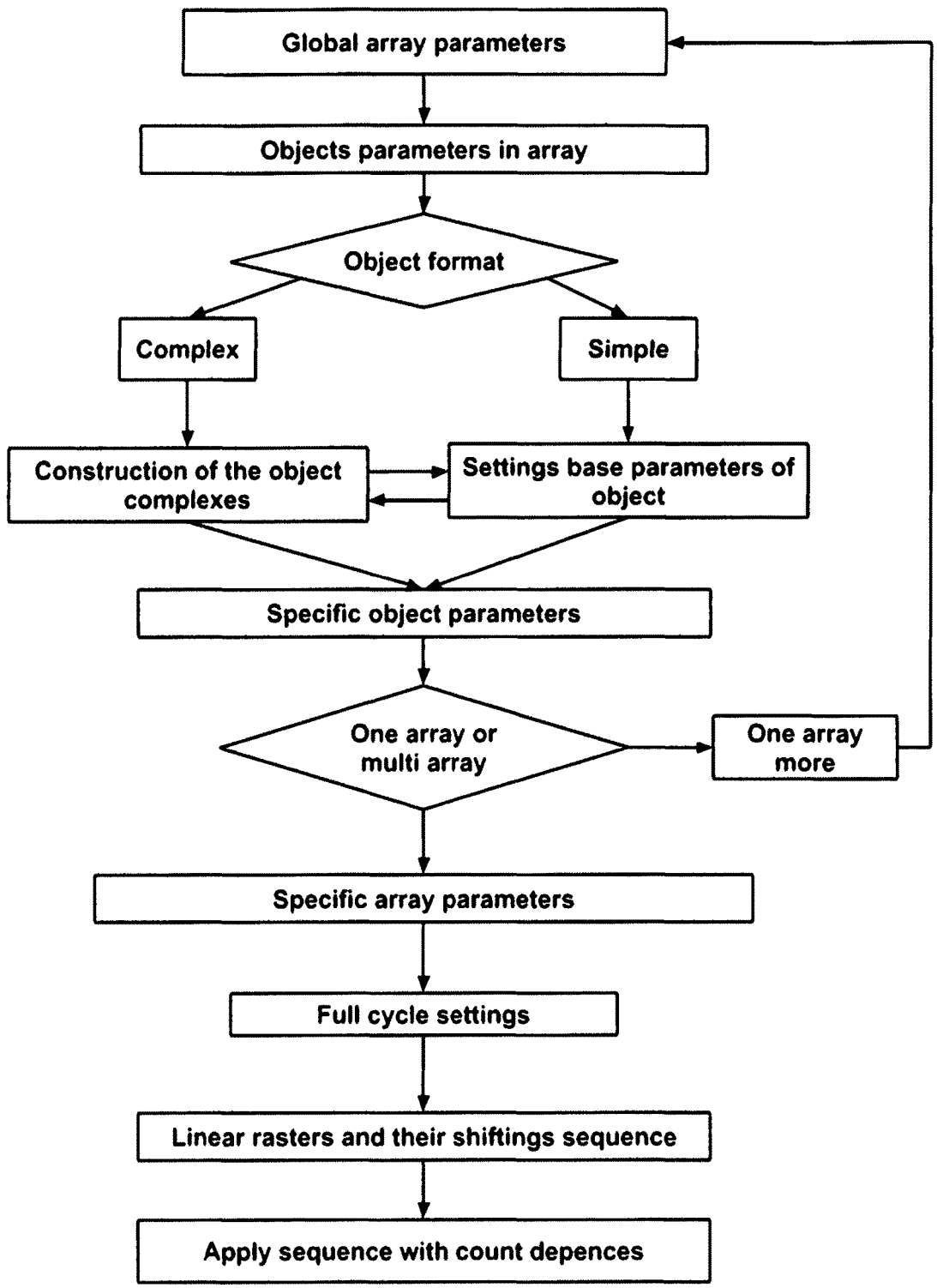

FIG. 19. Simplified block-scheme of algorithm for preparation of a sequence of linear rasters and their shifts for realisation of the shifted LST method.

MODES FOR CARRYING OUT THE INVENTION

Examples of use of the present invention are described in detail with reference to the accompanying drawings for demonstration of the shifted LST method and some technical solutions for it.

The first demonstration of shifted LST method is formation of array of objects having structure of two concentric circles. Like it was declared for the present invention, the base element of shifted LST is linear raster, with predefined distance between laser spots (FIG. 1). This distance between spots should be chosen according to the planned distribution of objects in the array. The next step is formation of a sequence of shifts of the linear raster for movement of the linear raster on a circle (FIG. 8, labelling 4—shifts of linear raster; movement on internal circle). Formation of the external circle is the same, only it is needed to use bigger radius for the shifts of the linear raster (FIG. 9, labelling 4—shifts of linear raster; sequenced movement on internal and external circles). The shorter movements of linear raster produce more continuously written objects in the whole array.

The second demonstration of the shifted LST method is formation of array of objects with specific distribution of the objects in the array. The objects have rectangular form with central hole inside. Construction of this array by the shifted LST method starts with preparation of a linear raster with laser beam paths with specific curvature (FIG. 10). Formation of the rectangular objects with hole inside is done by shifting movement of the linear raster along rectangular path and an extra application of linear raster for drilling holes inside of all rectangles (FIG. 11). This example clearly shows how to control distribution of objects inside of whole array by formation of laser beam paths in the basic linear raster.

The third demonstration of shifted LST method is a combination of two arrays with different objects and specific lines for formation of the University of West Bohemia logo. The first one array has objects placed along outline path, and the second one array has objects with two letters "CZ" for hatching the logo by them. Two independent linear rasters are prepared for the logo (FIG. 12 and FIG. 13, labelling 6—linear raster border). Linear raster on FIG. 12 is prepared for outline path. Then, by shifting movement of the linear raster along logo outline, objects in the form of small aligned logos (FIG. 14, labelling 4—shifts of linear raster; shifting path is enlarged) are formed. Linear raster for hatching has area smaller than the area of the logo outline path (FIG. 13, labelling 6—border of linear raster for hatching). Sequential shifting of this linear raster along letters "C" and "Z" lead to formation of full hatching array (FIG. 15, 4—shifts of linear raster; shifting path by letters "C" and "Z" is enlarged). Combination of these two sequences of shifted linear rasters leads to formation of a logo with complex structure (FIG. 16). It is needed to underline, that in this demonstration there are no data processing of all objects, but only shifts of two linear rasters. Moreover, scaling up of the logo (or generally array size) does not involve changes in the objects inside of logo outline path and hatch, because the quantity of objects is increasing correspondingly without quadratic increasing of data processing.

The fourth demonstration of the shifted LST method is formation of a macroobject from an array of microobjects in burst mode, when one laser spot is formed from several shots (FIG. 17). In this case, every object in the array plays a role of one pixel and this feature stay to be useful for reduction of polygon scanning systems artefacts, like jitter, banding, bow and other systematic problems. Moreover, as for all previous solutions in this case, the heat accumulation effect is overcome and plasma shielding effect is reduced too. The ordering of linear rasters in the macroobject can be provided by random algorithm, maximal possible shifting vector algorithm, simple sequence algorithm or other algorithm. Moreover, it is possible to use the shifted LST method for colour picture formation by using two or more arrays, where each array produces a specific colour on surface of material (for example three colours—red, green, blue), given by the laser and scanning parameters.

The last demonstration presents technical solution of shifted LST for hybrid polygon scanner (FIG. 18). The linear raster is projected on the polygon mirrors by galvanometer scan head. The actual galvanometric scan heads are very precise and the repeatability of spot position is about 3 micrometers. The polygon is rotating and as result the linear raster is stretched in the direction of rotation of polygon rotation. For this example the synchronisation between linear raster scanning and polygon rotation is produced by delay calculations. In this case, after one linear raster scan is finished the generation of laser pulses is stopped for a specific delay. This delay includes time for correct polygon mirror positioning and time needed for galvanometer scan head mirrors moving to the start position of the next shifted linear raster. When mirrors of the galvanometer scan head are on the start position and correct mirror of polygon is on the laser beam path the next shifted linear raster is under processing. Sequence of shifts, linear rasters and correction delays is supplied by special algorithm (FIG. 19). This algorithm includes logical branches for different options of shifted LST method—with deceleration and acceleration of laser beam scanning, with switching delay between laser pulses, with correction of polygon mirrors with linear rasters scanning process and so on. This algorithm predefines all shifted LST processing and when laser beam scanning is finished the next sequence is started with repetition, which is needed to apply for approaching to the goal depth of objects in the array.

INDUSTRIAL APPLICABILITY

The present invention of shifted LST is useful method for high and ultra-high speed laser beam processing of array of objects or macroobject composed of smaller objects. Especially the shifted LST method is actual for hybrid polygon scanning laser beam systems, when linear raster is produced by polygon mirror with control of lines curvature by galvanometer scan head. In hybrid polygon scanning laser systems with galvanometer scan head with two or more mirrors it is possible to control laser spot distance in laser beam paths by deceleration and acceleration of scan head mirrors. The shifted LST method processing algorithm can be included as an additional library in one of the actual softwares (like LaserDesk, SAMLight, Lighter or Trumpf). The second possibility is creation of a separate software product specialised on application of shifted LST method.

The invention claimed is:

1. A method of writing an array of objects on a surface or an inside of a material by shifted laser surface texturing, comprising:
    laser beam scanning writing a first linear raster, the first linear raster comprising a first plurality of distantly spaced laser spots in a line of the first linear raster; and
    sequential laser beam scanning writing at least one subsequent linear raster, wherein each of the at least one subsequent linear raster comprises a subsequent plurality of distantly spaced laser spots in a line of each of the at least one subsequent linear rasters at positions shifted relative to a preceding plurality of laser spots;

wherein the laser spots are grouped into the array of objects;

wherein each object in the array of objects is formed by a sequence of laser spots derived from at least one of the first and subsequent linear rasters; and wherein each object in the array of objects comprises a maximum of one laser spot from each of the lint and the at least one subsequent linear rasters.

2. The method according to claim 1, wherein the objects in the array of objects comprise geometric forms and a distribution of laser spots is determined by a sequence of linear raster shifts.

3. The method according to claim 1, wherein each laser spot contains one laser pulse.

4. The method according to claim 1, wherein each laser spot contains a plurality of laser pulses.

5. The method according to claim 1, wherein sequential shifts of linear rasters determine a structure and depth profile of the objects in the array of objects.

6. The method according to claim 1, wherein the objects in the array of objects are determined by a sequence of linear raster shifts.

7. The method according to claim 1, wherein a decrease of processing data quantity is achieved by definition of whole rasters and formation of a large array of objects by sequential composing of the laser spots from neighbouring rasters into the objects in the array of objects.

8. The method according to claim 1, wherein each of the objects in the array of objects is produced by a sequence of shifts of linear rasters comprising different distances between the laser spots in the lines of the first and the at least one subsequent linear rasters.

9. The method according to claim 1, wherein a distance between adjacent laser spots in the lines of the first and the at least one subsequent linear raster is determined by acceleration and deceleration of a laser beam; or by varying a delay between laser shots; or by a combination of the two.

10. The method acceding to claim 1, wherein a complex structure of objects in the array of objects is provided by a combined application of shifting sequences of different linear rasters.

11. The method according to claim 1, wherein the distribution of objects in the array of objects is provided by curvature, braking, or other line formation geometry in the linear rasters.

12. The method according to claim 1, wherein complex objects are produced by a combination of shifting sequences of different linear rasters.

13. The method according to claim 1, wherein a macroobject is formed from a plurality of arrays of microobjects, said microobjects optionally comprising different colors or surface structures.

14. The method according to claim 1, wherein either
a galvanometer scan head with two or more mirrors; or
a polygon scanning system; or
a combination of the two;
is used to control a distance between laser spots in the first or the at least one subsequent linear raster or a combination thereof by deceleration and acceleration of the step of laser beam scanning writing the first linear raster, the step of laser beam scanning the at least one subsequent linear raster, or both the steps of laser beam scanning writing the first linear raster and the at least one subsequent linear raster.

15. The method according to claim 1, wherein a shift between the first and the at least one subsequent linear rasters or between the at least one subsequent linear rasters is controlled by one or more mirrors of a galvanometer scan head or a hybrid polygon scanning system.

16. The method according to claim 15, wherein correction of polygon system artefacts is achieved by
one object—one spot using the one or more mirrors of the galvanometer scan head; or
by correction of lines in the linear rasters; or
by a combination of the two.

* * * * *